June 1, 1937. W. H. PETERSON 2,082,754
MINNOW BUCKET
Filed April 2, 1936

INVENTOR.
WILHELM H. PETERSON,
Geo Stevens
ATTORNEY.

Patented June 1, 1937

2,082,754

UNITED STATES PATENT OFFICE 2,082,754

MINNOW BUCKET

Wilhelm H. Peterson, Virginia, Minn.

Application April 2, 1936, Serial No. 72,292

3 Claims. (Cl. 43—56)

This invention relates to improvements in minnow pails or buckets and has for its principal object the provision of a minnow pail which will keep the minnows alive and in the best possible condition.

Another object is to provide a minnow pail having means for lifting all the minnows out of the water so that any one may be selected for the required bait.

A further object is to provide a minnow pail which may be conveniently manipulated with one hand.

A still further object is the provision of means associated with the pail whereby the water therein may be from time to time aerated.

Other objects and advantages of the invention will appear in the following description thereof.

Referring now to the accompanying drawing, forming part of this application, and wherein like reference characters indicate like parts:

Figure 1:
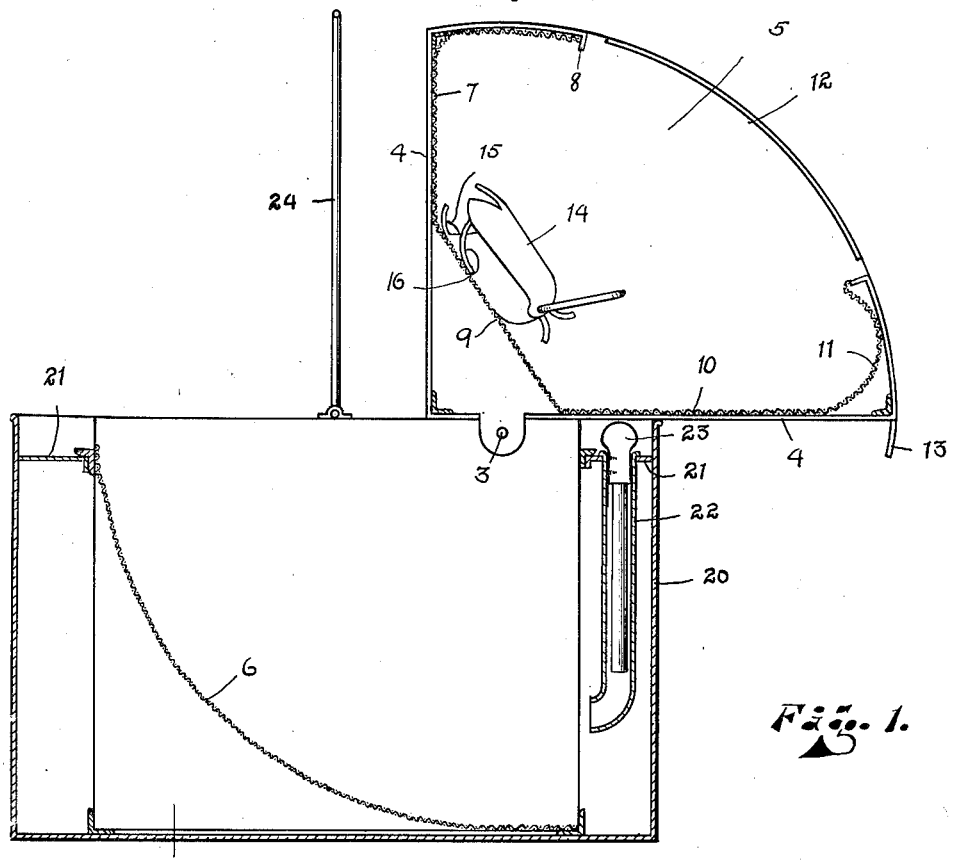
Figure 1 is a central longitudinal section of my improved minnow bucket and pail.
Figures 2, 3:
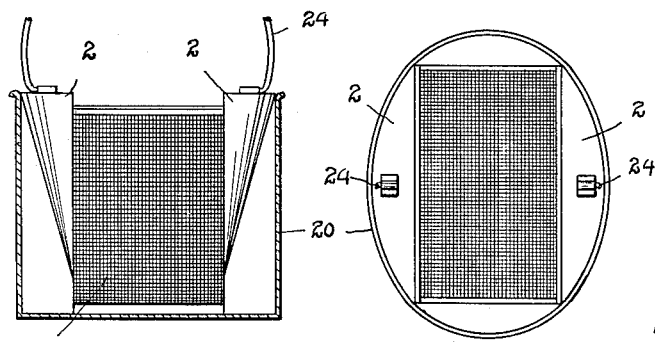
Figure 2 is a central transverse section through the pail and showing the bucket therein in elevation.
Figure 3 is a top plan view of the bucket and pail.
Figure 4:
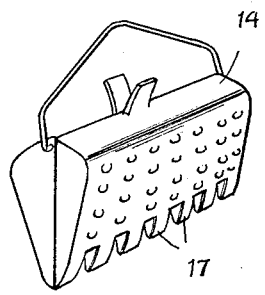
Figure 4 is a perspective view of a minnow trap for holding a minnow while being applied to a fish-hook.

The improved minnow bucket comprises a substantially rectangularly shaped frame structure 1 open upon all faces except the two opposite sides, and which sides are arcuate in shape as at 2, forming air chambers upon the opposite sides of the otherwise open frame structure. These air chambers taper inwardly toward the bottom thereof, so that when the bucket alone is placed in water, as for example alongside a dock, it will float uprightly therein.

Into this frame structure adjacent its upper edge and near one end thereof is pivotally mounted as at 3, a sector-shaped frame structure 4; only the opposite sides 5 of this structure being closed. In side elevation the structure 4 represents a sector of a circle, the arc being formed by use of the pivotal point 3 as its center so that when it is swung back into the air chambered frame or cage it is concentric with the wired or screened chord 6 of the same circle. Intermediate of the sides of the pivotal frame 4 is installed the wire netting 7 reaching from the point 8 forwardly, thence downwardly about half the radius of the frame, thence inclined as at 9 and again on the radius of the frame as at 10, thence backwardly towards itself in a semicircle as at 11, the latter being for the convenience of reaching in with one's fingers to pick up a single minnow through the open space in the frame indicated at 12; there being a suitable catch indicated at 13 which also operates as a handle for swinging the structure 4 into and out of position.

The entire apparatus is designed for insertion within an oval pail 20, or the device when closed may be suspended from the side of a boat, or in any body of water desired, to keep the minnows alive. The principal convenience of the device is that when a minnow is wanted the structure 4 may be thrown to open position as illustrated when all of the minnows will be free from water, flopping about in the screened device and available through the opening 12, and, after one is selected, of course, the structure 4 may be thrown back into the cage 1 and the arcuate screen shield will cover the opening 12 and keep the minnows perfectly safe at all times.

As a further convenience there is illustrated at 14 a small hand trap which may be sprung into open position as shown and tucked under a pair of parallel clips 15 attached to the inclined portion 9 of the screen in the frame 4, where it will be conveniently held; the arcuate clip 16 keeping the jaws of the trap open when in such position, so that as the frame 4 is swung to the position shown and the minnows carried up on the portion 7 of the wire some will naturally fall into the trap, and by its bail it may be removed and a minnow very conveniently applied to a hook through the teeth 17 of the trap, when it may be opened and returned to its normal position ready to catch another minnow when the tipping act is again repeated.

The air chambers 2 are shown as arcuate in form to fit an oval minnow pail, as that is a very common form, though they may be of other shapes, if desired. At either end of the pail, and in substantially a plane with the top of the structure 4 when down, are secured a pair of flanges 21 which fill the space between the ends of the bucket and pail. Through one of these flanges a tube 22 extends, at the upper end of which is a bulb 23 and by the squeezing of which air may be forced downwardly into the water, thus aerating the same for the better preservation of the minnows.

To the upper surfaces of the air chambers 2

I have pivotally fixed the bail 24 for convenience in lifting the bucket when desired.

Having thus described my invention, what I claim and desire to secure by Letters Patent, is:

1. A minnow bucket comprising a pair of air chambers supported in spaced relation, an arcuately shaped or curved screen supported between said air chambers, and a sector shaped screened frame structure pivoted to the sides of said chambers adjacent upper corners thereof, whereby the sector-shaped structure may be positioned between or above said air chambers.

2. A minnow bucket comprising spaced side members, an arcuately shaped screen secured between said side members, and a sector shaped screened frame structure having an opening in the arcuate surface thereof, said arcuate surface being coincident with the curvature of the screen between the side members whereby when the sector shaped structure is positioned between said side members the screen between said side members will act as a closure for the opening in the sector shaped structure.

3. A minnow bucket comprising spaced buoyant side members, and a sector shaped screened frame structure having an opening in the arcuate surface thereof for access to the interior thereof, said sector shaped structure being pivoted to said side members in a manner whereby it may be moved either entirely between said side members or entirely above the same.

WILHELM H. PETERSON.